US007529176B2

(12) United States Patent
Verlinden et al.

(10) Patent No.: US 7,529,176 B2
(45) Date of Patent: May 5, 2009

(54) METHOD AND APPARATUS FOR DETERMINING A TRANSMIT PSD AT A REMOTE LOCATION

(75) Inventors: Jan Sylvia Verlinden, Wommelgem (BE); Etienne André Hubert Van Den Bogaert, Pepingen (BE); Geert Bert Maarten Ysebaert, Winksele (BE)

(73) Assignee: Alcatel, Paris (FR)

( * ) Notice: Subject to any disclaimer, the term of this patent is extended or adjusted under 35 U.S.C. 154(b) by 597 days.

(21) Appl. No.: 11/305,270

(22) Filed: Dec. 19, 2005

(65) Prior Publication Data

US 2006/0133534 A1 Jun. 22, 2006

(30) Foreign Application Priority Data

Dec. 20, 2004 (EP) .................................. 04293061

(51) Int. Cl.
*H04B 15/00* (2006.01)

(52) U.S. Cl. ...................... 370/201; 370/252; 370/286; 375/254; 375/285; 375/346; 379/406.01

(58) Field of Classification Search ................ 370/201, 370/252, 286, 289; 379/3, 406.01; 375/254, 375/346, 222, 285
See application file for complete search history.

(56) References Cited

U.S. PATENT DOCUMENTS 6,317,495 B1 * 11/2001 Gaikwad et al. ............ 379/417

(Continued)

FOREIGN PATENT DOCUMENTS

EP          1 248 383 A1      10/2002

| EP | 1 300 964 A1 | 4/2003 |
| WO | WO 02/058315 A1 | 7/2002 |

OTHER PUBLICATIONS

Gaikwad R V et al.: "Spectral Optimization for Communication in the Presence of Crosstalk" Proceedings of the Annual Conference on Information Sciences and Systems, XX, XX, Nov. 15, 1999, pp. 1-6, XP001060369.

(Continued)

*Primary Examiner*—Chi H Pham
*Assistant Examiner*—Ahmed Elallam
(74) *Attorney, Agent, or Firm*—Harness, Dickey & Pierce

(57) ABSTRACT

The present invention relates to a method for determining a transmit PSD over a remotely-deployed line, which method comprising the steps of:
  modeling a first far-end crosstalk originating from the line and coupling into a centrally-deployed victim neighboring line,
  modeling a second far-end crosstalk originating from a further centrally-deployed neighboring line and coupling into the victim neighboring line,
  determining the transmit PSD from the first modeled far-end crosstalk and the second modeled far-end crosstalk.

A method according to the invention further comprises the steps of:
  expressing the transmit PSD as a function of a line parameter characterizing a line segment of the further neighboring line,
  carrying out channel measurements of a spare line that connects the central location to the remote location, and that shares common transmission characteristics with the line segment,
  estimating from said channel measurements a value of the line parameter,
  determining therefrom the transmit PSD.

The present invention also relates to a power control unit.

7 Claims, 3 Drawing Sheets

U.S. PATENT DOCUMENTS

| | | | |
|---|---|---|---|
| 6,807,228 B2 * | 10/2004 | Agazzi et al. | 375/232 |
| 7,002,930 B2 * | 2/2006 | Ahmed et al. | 370/286 |
| 7,020,099 B2 * | 3/2006 | Agazzi | 370/286 |
| 7,035,400 B1 * | 4/2006 | Gaikwad et al. | 379/417 |
| 7,158,563 B2 * | 1/2007 | Ginis et al. | 375/224 |
| 7,359,428 B2 * | 4/2008 | Rovini et al. | 375/141 |
| 2004/0095921 A1 * | 5/2004 | Kerpez | 370/351 |
| 2004/0136332 A1 * | 7/2004 | Duvaut et al. | 370/295 |
| 2005/0026572 A1 * | 2/2005 | Dasgupta et al. | 455/114.2 |
| 2005/0213714 A1 * | 9/2005 | Langberg et al. | 379/32.01 |
| 2005/0259725 A1 * | 11/2005 | Cioffi | 375/222 |
| 2005/0271075 A1 * | 12/2005 | Cioffi et al. | 370/445 |

OTHER PUBLICATIONS

Cendrillon R. et al: "Optimal Multi-user Spectrum Management for Digital Subscriber Lines", Jun. 2004, IEEE International Communications Conference, Paris, pp. 1-5.

Annex C4 of "Spectrum Management for Loop Transmission System", T1.417-2003, American national Standards Institute (ANSI) 2003, pp. 129-137.

"Laboratory Performance Test for xDSL Systems", ref. TM6(98)10, European Telecommunication Standards Institute (ETSI), revised Feb. 5, 2001, p. 16.

* cited by examiner

METHOD AND APPARATUS FOR DETERMINING A TRANSMIT PSD AT A REMOTE LOCATION

The present invention relates to a method for determining a transmit Power Spectral Density (PSD) to be applied at a remote location over at least one line connecting said remote location to at least one customer location, which method comprising the steps of:

modeling a first far-end crosstalk originating from said at least one line and coupling into a victim neighboring line as a first modeled far-end crosstalk, which victim neighboring line connecting a central location through said remote location to a neighboring customer location, modeling a second far-end crosstalk originating from at least one further neighboring line and coupling into said victim neighboring line as a second modeled far-end crosstalk, which at least one further neighboring line connecting said central location through said remote location to at least one further neighboring customer location, determining, by means of a mathematical derivation, said transmit PSD from said first modeled far-end crosstalk and said second modeled far-end crosstalk.

The document entitled "*Optimal Multi-User Spectrum Management for Digital Subscriber Lines*" published in June 2004 in IEEE International Communications Conference, Paris, pp. 1-5, discloses such a method, further referred to as the OSM algorithm.

A substantial portion of the initial transmit power applied to a transmission line leaks (or couples) into neighboring lines on account of proximity and imperfect line shielding. This phenomena is referred to as crosstalk noise (or simply crosstalk).

Crosstalk noise that occurs when a receiver on a disturbed (or victim) line is located at the same end of the cable as the transmitter of a disturbing (or interfering) line is called Near-End CrossTalk (NEXT). Crosstalk noise that occurs when a receiver on a disturbed line is located at the opposite end of the cable as the transmitter of the disturbing line is called Far-End CrossTalk (FEXT).

Crosstalk is sensitive to frequency, signal strength, and exposure.

High frequency energy couples into neighboring lines more than low frequency energy does because as the signal frequency increases, the crosstalk coupling loss between lines decreases. Hence, for two signals of equal strength, the higher the frequency, the greater the crosstalk noise.

A strong signal will transfer more power into neighboring lines than will a weaker signal. The amount of crosstalk noise is directly proportional to the power of the disturbing signal. The stronger the disturbing signal, the greater the crosstalk noise. Thus, one of the most effective means for controlling crosstalk noise is to limit the signal energy that is applied to lines.

Exposure is a measure of the proximity of neighboring lines at various points along a cable and the length over which lines are in close proximity. The greater the exposure, the greater the crosstalk noise. The exposure is maximum for lines that are enclosed along part or whole of their length within the same binder.

Crosstalk is the dominant source of performance degradation for most Digital Subscriber Line (DSL) communication systems, such as Asymmetric Digital Subscriber Line (ADSL) and Very high speed Digital Subscriber Line (VDSL) systems.

Legacy communication services (ADSL) were typically deployed over twisted pairs from a central location, e.g. from a central office, towards customer locations. Yet, more recent technologies (VDSL) require short loop length, and are deployed from a remote location that is closer to customer locations.

Because of Local Loop Unbundling (LLU), centrally and remotely-deployed services may co-exist within the same binder. This is known as mixed deployment. The noise source (i.e., the transmitter at the remote location) is brought much closer to customer premises, which is particularly harmful for centrally-deployed services.

In mixed deployment, crosstalk noise is typically 20-30 dB larger than the background noise. Because downstream and upstream communications make use of two non-overlapping frequency bands, it is further assumed that crosstalk noise predominantly reduces to far-end crosstalk, and that near-end crosstalk contribution is negligible (or is assigned a default value, or is assimilated to or combined with the background noise).

The effects of crosstalk must be mitigated through spectral management. With spectral management the transmit spectra of a transceiver is limited in some way to minimize the negative effects of crosstalk.

Static Spectrum Management (SSM) is the traditional approach. In SSM, spectral masks are employed which are identical for all transceivers. To ensure widespread deployment, these masks are based on worst case scenarios. As a result they can be overly restrictive and lead to poor performance.

Dynamic Spectrum Management (DSM), a new paradigm, overcomes this problem by designing the spectra of each transceiver to match the specific environment of that transceiver. They are customized to suit each transceiver in each particular situation.

Various mathematical models have been defined for modeling far-end crosstalk in DSM.

Annex C4 of the document entitled "*Spectrum Management for Loop Transmission System*", ref T1.417-2003, published by the American National Standards Institute (ANSI) in 2003, models far-end crosstalk as a function of well-defined transmission parameters, such as the PSD of the signal applied to the disturbing line, the insertion gain of the transmission line, the coupling length, etc.

Other interference models might be used too, e.g. as defined on page 16 of the document entitled "*Laboratory Performance Test for xDSL Systems*", ref. TM6(98)10, published by the European Telecommunication Standards Institute (ETSI), and revised on the 5 Feb., 2001.

The OSM algorithm determines the transmit PSD to be applied at a remote location in order to achieve respective service levels for centrally and remotely-deployed communication services (in OSM, a service level is defined as a target bit rate). More specifically, the OSM method makes use of an interference model wherein information regarding line length, line type, crosstalk channels, noise source, etc, are available, e.g. from a network operator database. The OSM method may also assume worst-case values for some (still) unknown parameters.

It is an object of the present invention to alleviate the operator from the burden of collecting loop data from the field, and of maintaining them up-to-date.

According to the invention, this object is achieved due to the fact that said method further comprises the steps of:

expressing, as part of said mathematical derivation, said transmit PSD as a function of a line parameter, which line parameter characterizing a line segment of said at least one further neighboring line spanning from said central location to said remote location, carrying out channel measurements of a spare line that connects said central location to said remote location, which spare line and which line segment sharing common transmission characteristics, estimating from said channel measurements a value of said line parameter, determining therefrom said transmit PSD.

Typically, a binder enclosing many twisted pairs span from the central location towards neighboring customer locations. A remote unit is placed at some point along this binder. If a particular customer location needs to be connected to the remote unit (e.g., for enhanced communication services), the line that connects the central location to that customer location is derived at the remote location towards the remote unit: the first line segment that spans from the remote location to the customer location is connected to a transceiver unit of the remote unit for operation, while the second line segment that spans from the central location to the remote location (further referred to as a spare line) is left unused since the remote unit is typically fed with a dedicated optical fiber.

By carrying out channel measurements over a spare line, parameters that are used for modeling the second crosstalk are assigned more accurate and realistic values.

This solution is advantageous in that the transmit PSD is no longer based upon guessed or worst-case values, but rather on estimated values that are directly derived from measurements carried out over the spare line, thereby leading to a close-to-optimal transmit PSD at the remote location.

This solution is further advantageous in that the transmit PSD is autonomously and automatically determined, without the need to supply the remote unit with loop plant characteristics.

The invention is based upon an insight that the spare line and the further neighboring lines share some common transmission characteristics between the central and remote locations, which is a reasonable hypothesis for lines enclosed within the same binder.

An embodiment of a method according to the invention is characterized in that said channel measurements are obtained by means of time-domain reflectometry.

Time-domain reflectometry provides good results for estimating the length of a transmission line. The loop insertion gain of a transmission line can also be obtained from time-domain reflectometry. Because time-domain reflectometry injects a substantially strong signal into the line, the time-domain reflectometry unit is likely being located at central location, thereby causing less interference to neighboring transmission systems.

Another embodiment of a method according to the invention is characterized in that said channel measurements are obtained by initializing a communication path over said spare line between a first transceiver unit and a second transceiver unit.

This embodiment is particularly advantageous in that existing initialization and training procedures are re-used for measuring the line characteristics.

Still another embodiment of a method according to the invention is characterized in that said channel measurements comprise measurements of a response signal, which response signal being the response to a preliminary-known excitation signal that propagates through said spare line.

The channel measurements may also comprise passive measurements, such as measuring the background noise level on the spare line A further embodiment of a method according to the invention is characterized in that said line parameter is a length.

The transmit PSD may be ultimately expressed as a function interalia of this parameter, as it will be set forth further in the description.

Another embodiment of a method according to the invention is characterized in that said line parameter is a loop insertion gain magnitude.

The transmit PSD may be ultimately expressed as a function interalia of this parameter, as it will be set forth further in the description.

The transmit PSD may also be expressed as a function of further transmission parameters, the values of which are guessed, pre-configured, or estimated from measurements carried out over the at least one line.

The present invention also relates to a power control unit adapted to determine a transmit PSD to be applied at a remote location over at least one line connecting said remote location to at least one customer location, and comprising a computing means adapted to determined by means of a mathematical derivation, said transmit PSD from a first modeled far-end crosstalk and a second modeled far-end crosstalk, which first modeled far-end crosstalk modeling a first far-end crosstalk originating from said at least one line and coupling into a victim neighboring line, which victim neighboring line connecting a central location through said remote location to a neighboring customer location, which second modeled far-end crosstalk modeling a second far-end crosstalk originating from at least one further neighboring line and coupling into said victim neighboring line, which at least one further neighboring line connecting said central location through said remote location to at least one further neighboring customer location.

Such a power control unit may form part of a remote access unit, or an Ethernet bridge adapted to run Ethernet over the last mile (e.g., IEEE 802.3ah), etc.

A power control unit according to the invention is characterized in that said computing means is further adapted to express, as part of said mathematical derivation, said transmit PSD as a function of a line parameter, which line parameter characterizing a line segment of said at least one further neighboring line spanning from said central location to said remote location, in that said transmit power control unit further comprises:
a measurement means adapted to carry out channel measurements of a spare line that connects said central location to said remote location, which spare line and which line segment sharing common transmission characteristics, an estimation means coupled to said measurement means, and adapted to estimate from said channel measurements a value of said line parameter, and in that said computing means is coupled to said estimating means, and is further adapted to determine therefrom said transmit PSD.

Embodiments of a power control unit according to the invention correspond with the embodiments of a method according to the invention.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The above and other objects and features of the invention will become more apparent and the invention itself will be best understood by referring to the following description of an embodiment taken in conjunction with the accompanying drawings wherein.

Figure 1:
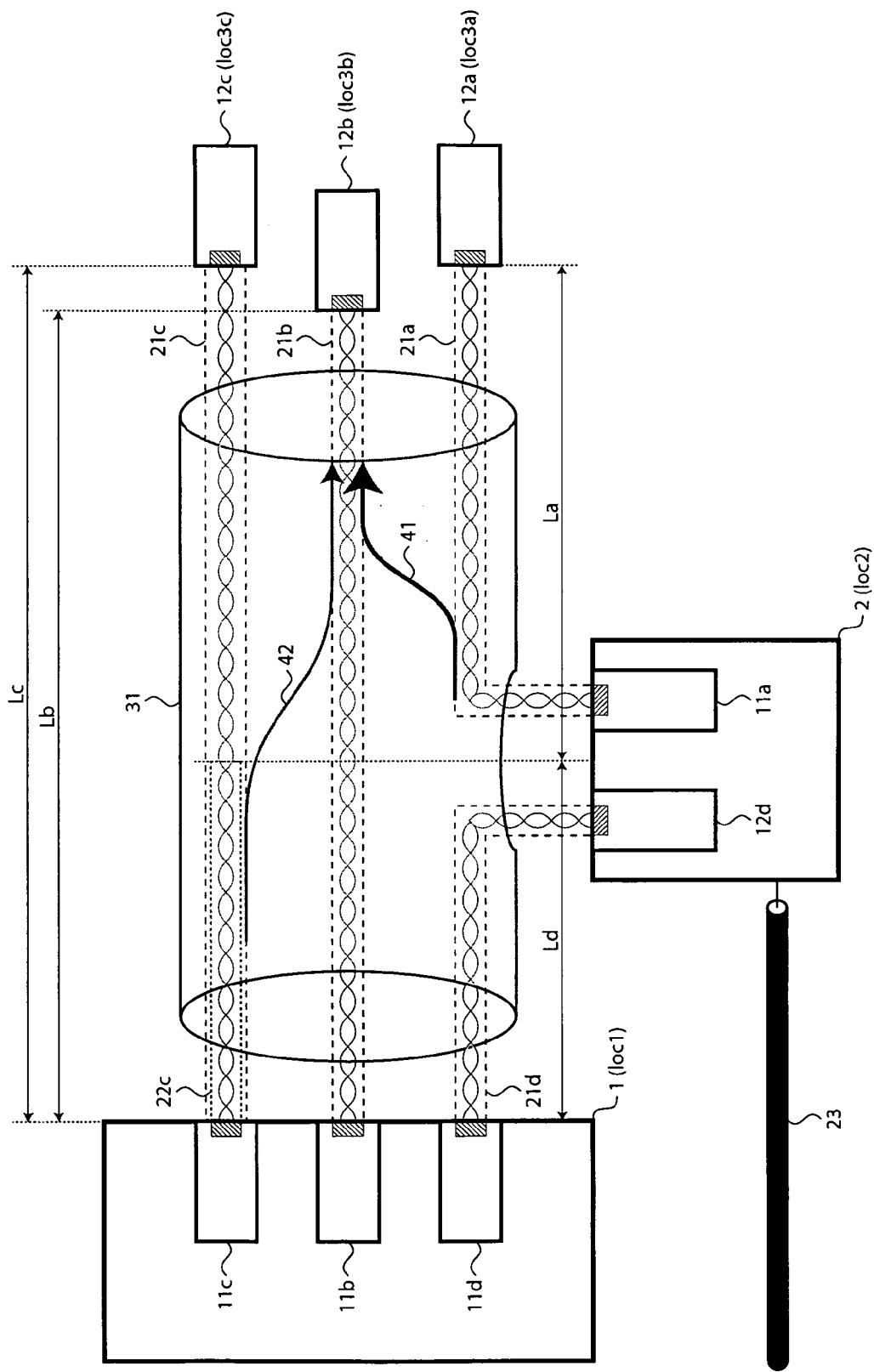
FIG. 1 represents a data communication system.

There is seen in FIG. 1 a data communication system comprising:
- a central unit 1 at a central location loc1 accommodating transceiver units 11*b*, 11*c* and 11*d*,
- a remote unit 2 at a remote location loc2 accommodating transceiver units 11*a* and 12*d*,
- transceiver units 12*a*, 12*b* and 12*c* at customer locations loc3*a*, loc3*b* and loc3*c* respectively.

In a preferred embodiment of the present invention, the data communication system is DSL-based. The central unit 1 is for instance a Digital Subscriber Line Access Multiplexer (DSLAM) at a central office that supports ADSL services for providing broadband access to subscribers, and the remote unit is for instance a remote access unit at a remote cabinet fed with a dedicated optical fiber 23 for deploying VDSL services and/or enhanced ADSL services (ADSL 2+). The transceiver units 11 and 12 are DSL transceiver units. The transceiver unit 12*a* is for instance a DSL modem, the transceiver unit 12*b* is for instance a network interface card forming part of a user terminal such as a Personal Computer (PC), and the transceiver unit 12*c* is for instance a set top box.

Yet, the scope of the present invention is not limited to DSL-based communication systems. The present invention is applicable to whatever type of digital or analog communication systems wherein the far-end crosstalk is a predominant source of noise.

The transceiver unit 11*a*, 11*b*, 11*c* and 11*d* are coupled to the transceiver unit 12*a*, 12*b*, 12*c* and 12*d* via twisted pairs 21*a*, 21*b*, 21*c* and 21*d* respectively.

The twisted pair 21*a*, 21*b*, 21*c* and 21*d* are enclosed within the same binder 31. The lengths of the twisted pairs 21*a*, 21*b*, 21*c* and 21*d* are denoted as La, Lb, Lc and Ld respectively.

It is to be noticed that the twisted pair 21*a* and 21*d* were part of the same initial twisted pair. This initial twisted pair used to span from the central location loc1 to the customer location loc3*a*, and was derived at the remote location loc2 for connection to the remote unit 2.

The line 21*b*, which is assumed to be the victim line, is mostly disturbed by far-end crosstalk: a first far-end crosstalk 41 originates from the line 21*a*, and a second far-end crosstalk 42 originates from the line 21*c*.

The transmit PSDs applied in the downstream direction (i.e., from the central or remote location towards the customer locations) over the twisted pairs 21*a*, 21*b*, 21*c* and 21*d* are denoted as Sa, Sb, Sc and Sd respectively.

Finally, the line segment 22*c* represents the portion of the line 21*c* that spans from the central location loc1 to the remote location loc2, the physical characteristics of which are estimated by carrying out channel measurements of the line 21*d*, as it will be set forth further in the description.

Figure 3:
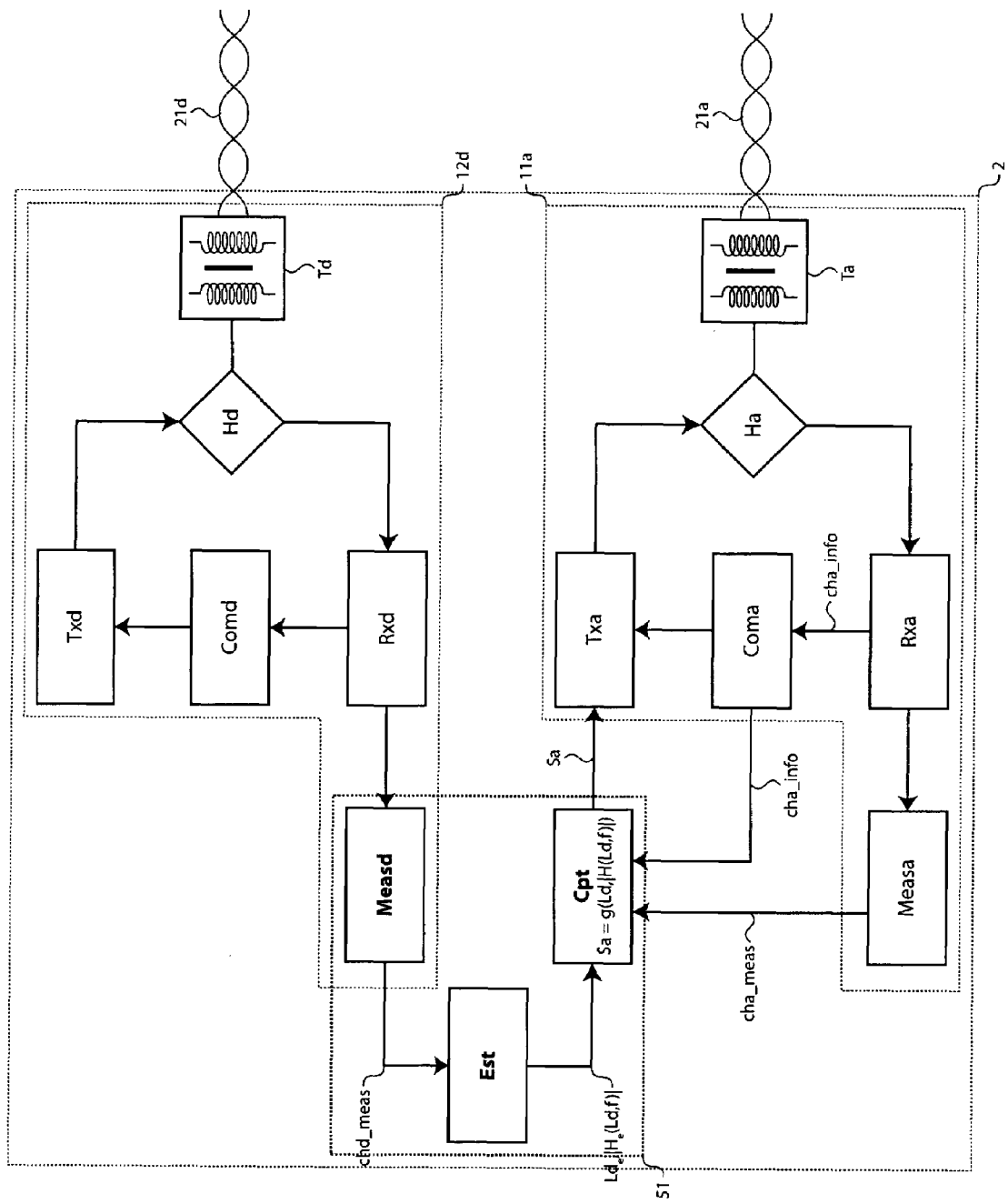
FIG. 3 represents a remote unit according to the invention.

There is seen in FIG. 3 a preferred embodiment of a remote unit according to the invention, presently the remote unit 2, comprising the following functional blocks:
- the transceiver units 11*a* and 12*d*,
- a power control unit 51.

The power control unit 51 is coupled to both the transceiver units 11*a* and 12*d*.

The transceiver unit 11*a* comprises the following functional blocks:
- a transmitter unit Txa,
- a receiver unit Rxa,
- a measurement unit Measa,
- a communication means Coma,
- a hybrid circuit Ha,
- a line adaptor Ta.

The transmitter unit Txa and the receiver unit Rxa are both coupled to the hybrid circuit Ha. The hybrid circuit Ha is coupled to the line adaptor Ta. The line adaptor Ta is coupled to the twisted pair 21*a*. The communication means Coma is coupled to both the transmitter unit Txa and the receiver unit Rxa. The measurement unit Measa is coupled to the receiver unit Rxa.

The transceiver unit 12*d* comprises the following functional blocks:
- a transmitter unit Txd,
- a receiver unit Rxd,
- a measurement unit Measd,
- a communication unit Comd,
- a hybrid circuit Hd,
- a line adaptor Td.

The transmitter unit Txd and the receiver unit Rxd are both coupled to the hybrid circuit Hd. The hybrid circuit Hd is coupled to the line adaptor Td. The line adaptor Td is coupled to the twisted pair 21*d*. The communication means Comd is coupled to both the transmitter unit Txd and the receiver unit Rxd. The measurement unit Measd is coupled to the receiver unit Rxd.

The power control unit 51 comprises the following functional blocks:
- the measurement unit Measd,
- an estimating unit Est,
- a computing unit Cpt.

The estimating unit Est is coupled to the measurement unit Measd. The computing unit Cpt is coupled to the estimating unit Est, to the transmitter unit Txa, to the communication unit Coma and to the measurement unit Measa.

The transmitter units Txa and Txd accommodate the necessary means for encoding user and control data and for modulating DSL tones with the so-encoded data. The transmitter unit Txa further accommodates the necessary means for controlling the transmit power of each tone, as enforced by the power control unit 51.

The receiver units Rxa and Rxd accommodate the necessary means for demodulating a DSL signal and for decoding user and control data from the so-demodulated signal.

The hybrid circuits Ha and Hd are adapted to couple the transmitter unit's output to the twisted pairs 21*a* and 21*d* respectively, and the twisted pairs 21*a* and 21*d* to the respective receiver unit's inputs. The hybrid circuit Ha and Hd accommodate an echo cancellation means to avoid the transmitted signal to couple into the receiver unit's input.

The line adaptors Ta and Td are adapted to isolate the transceiver unit 101*a* and 101*d* from the twisted pair 21*a* and 21*d* respectively, and to adapt the input and output impedance of the transceiver unit to the line characteristic impedance.

The communication unit Coma is adapted to establish a control communication path over the line 21a with the transceiver unit 12a. The transceiver unit 12a carries out channel measurements of the line 21a, and reports information cha_info derived from those channel measurements, such as bit loading and relative gain information, to the transceiver unit 11a via the control communication path.

Similarly, the communication unit Comd is adapted to establish a control communication path over the line 21d with the transceiver unit 11d.

The measurement units Measa and Measd are adapted to carry out local channel measurements cha_meas and chd_meas of the lines 21a and 21d respectively. Which measurement is performed closely depends on which physical characteristic is estimated for determining the transmit PSD Sa, as it will be set forth further in the description.

The estimating unit Est is adapted to estimate the physical channel characteristics of the line segment 22c from the channel measurements chd_meas supplied by the measurement unit Measd. Which physical characteristic is estimated closely depends on which interference model is used for determining the transmit PSD Sa, as it will be set forth further in the description.

The computing unit Cpt is adapted to compute the transmit PSD Sa as a function g of well-specified parameters, all or a part of which being estimated by the estimating unit Est. The so-computed transmit PSD Sa is made available to the transmitter unit Txa.

Various mathematical derivations of the transmit PSD Sa follow.

Denote the loop insertion gain of the lines 21 as H(l,f), where the loop length is denoted as l and the frequency is denoted as f.

Denote the numbers of centrally and remotely deployed lines that surround the victim line 21b within the binder 31 as $n_c$ and $n_r$ respectively.

The victim line 21b is further assumed to be the shortest line (worst case).

The far-end crosstalk 41 originating from $n_r$ lines 21a and coupling into the line 21b can be modeled as:

$$41_m = k n_r^{0.6} (L_b - L_d) f^2 |H(L_b - L_d, f)|^2 S_a(f) \quad (1)$$

where k denotes a constant modeling the line properties (k may depend on frequency too).

Similarly, the far-end crosstalk 42 originating from $n_c$ lines 21c and coupling into the line 21b can be modeled as:

$$42_m = k n_c^{0.6} L_b f^2 |H(L_b, f)|^2 S_c(f) \quad (2)$$

The Full Service Access Network (FSAN) summation method was applied in expressions (1) and (2).

Yet, a normal summation would yield the following:

$$41_m = k n_r (L_b - L_d) f^2 |H(L_b - L_d, f)|^2 S_a(f) \quad (3)$$

$$42_m = k n_c L_b f^2 |H(L_b, f)|^2 S_c(f) \quad (4)$$

The transceiver units 11b and 12b are typically designed to undergo a pre-determined amount of crosstalk from a pre-determined number of centrally deployed lines.

In a preferred embodiment of the present invention, Sa is computed such that the far-end crosstalk originating from $n_r$ remotely-deployed lines matches the far-end crosstalk originating from $n_c$ centrally-deployed lines (resulting in a 3 dB SNR loss or 1 bit per tone), or alternatively such that:

$$41_m = 42_m \quad (5)$$

By further making use of the propriety:

$$|H(L_b, f)|^2 = |H(L_b - L_d, f)|^2 |H(L_d, f)|^2 \quad (6)$$

one obtains:

$$S_a(f) = g(L_d, |H(L_d, f)|) = \left(\frac{n_c}{n_r}\right)^{0.6} \frac{L_b}{(L_b - L_d)} |H(L_d, f)|^2 S_c(f) \quad (7)$$

This expression can be further simplified by assuming that Lb=La+Ld, that is to say that the victim line 21b stands for the initial line 21a+21d:

$$S_a(f) = g(L_d, |H(L_d, f)|) = \left(\frac{n_c}{n_r}\right)^{0.6} \left(1 + \frac{L_d}{L_a}\right) |H(L_d, f)|^2 S_c(f) \quad (8)$$

The modeled far-end crosstalk $41_m$ and $42_m$ may satisfy other matching criteria.

For instance, Sa may be computed such that the far-end crosstalk originating from $n_r$ remotely-deployed lines matches the far-end crosstalk originating from $n_c$ centrally-deployed lines plus a loop-independent background noise denoted as $N_{LI}(f)$. The latter represents white (or thermal) noise and near-end crosstalk, and is typically assigned a default value, or is estimated from measurements carried out at the customer location loc3a.

A real weighted factor a comprised between 0 and 1 may further be introduced in expression (5) to give higher precedence to remotely-deployed services.

Still assuming Lb=La+Ld, this would yield the following:

$$41_m = \alpha(42_m + N_{LI}(f)) \quad (9)$$

$$S_a(f) = g(L_d, |H(L_d, f)|) = \quad (10)$$
$$\alpha \left(\frac{n_c}{n_r}\right)^{0.6} \left(1 + \frac{L_d}{L_a}\right) |H(L_d, f)|^2 S_c(f) + \frac{\alpha N_{LI}(f)}{k n_r^{0.6} L_a f^2 |H(L_a, f)|^2}$$

An operation of the preferred embodiment follows with reference to the expression (8) for the determination of the transmit PSD Sa.

The parameters $n_c$ and $n_d$ are assigned default values, e.g. based on a particular binder type that is used in the field, or based upon a worst-case value, or based upon an average value.

The loop insertion gain amplitude |H(Ld,f)| and the length Ld are estimated by the estimating unit Est based upon the channel measurements chd_meas.

The measurement unit Measd measures the response magnitude to a preliminary known excitation signal injected by the transceiver unit 11d, e.g. during an initialization phase.

The measurement unit Measd may also measure further signal characteristics, such as a group delay, a signal phase, etc.

The measurement unit Measd may be further coupled to the transmitter unit Txd and may perform time-domain reflectometry over the line 21d (in this case, the line 21d is not connected to the central unit 1 and is left open). Time-domain reflectometry gives more accurate estimation of the loop length since the speed of an electrical signal is much less dependent on the loop type than the channel attenuation is.

The channel measurements chd_meas are supplied to the estimating unit Est. The estimating unit Est estimates therefrom the loop insertion gain amplitude |H(Ld,f)| and the length Ld of the line 21d. The length can be derived from the loop insertion gain amplitude assuming a particular line type, or can be directly measured (recent communication technologies such as VDSL allow the direct measure of the loop length).

The line length La can be similarly derived from channel measurements carried out over the line 21a at the remote location loc2 or at the customer location loc3a. For instance, the transceiver unit 12a may measure the loop insertion gain amplitude of the line 21a while initializing a communication path over that line, derive the line length La therefrom and sends the line length La as part of cha_info. The loop length La may also be directly measured by the measurement unit Measa and passed to the computing means Cpt as part of cha_meas.

The transmit PSD Sc is assigned a default value based on the particular technology deployed from the central location loc1.

The transmit PSD Sc may also be estimated by measuring the background noise on the line 21d. The far-end crosstalk that couples from $n_c$ lines 21c into the line 21d is denoted as FEXTd, and can be modeled as:

$$\text{FEXTd}_m = k n_c^{0.6} L_d f^2 |H(L_d, f)|^2 S_c(f) \tag{11}$$

Denote the noise measured on the line 21d as $N_d(f)$. The transmit PSD Sc is then given by:

$$S_c(f) = \frac{N_d(f) - N_{Ll}(f)}{k n_c^{0.6} L_d f^2 |H(L_d, f)|^2} \tag{12}$$

The estimating unit Est may then estimate the transmit PSD Sc by means of the expression (12), given the measured noise $N_d(f)$ and the previously-estimated parameters.

The estimating unit Est provides the computing unit Cpt with the so-estimated parameters $Ld_c$, $|He(Ld,f)|$, and possibly $Sc_e(f)$.

The computing unit Cpt computes the transmit PSD Sa by means of the expression (8), and makes the so-computed transmit PSD Sa available to the transmitter unit Txa The transmitter unit Txa may apply the so-computed transmit PSD Sa as such, or as a spectral power mask which the actual (or operational) transmit PSD must conform to (e.g., if a target rate is defined over the subscriber line 21a that is lower than the one that could potentially be achieved with the transmit PSD Sa, and/or if the channel conditions do not require that amount of power).

It is to be noticed that the transmitter unit Txa may apply the transmit PSD Sa only for the tones that are used over both the line 21a and 21b (e.g., tones that are part of both ADSL and VDSL bands), and may stick to the maximum allowed power for the other tones (e.g., tones that are part of the VDSL band only).

Figure 2:
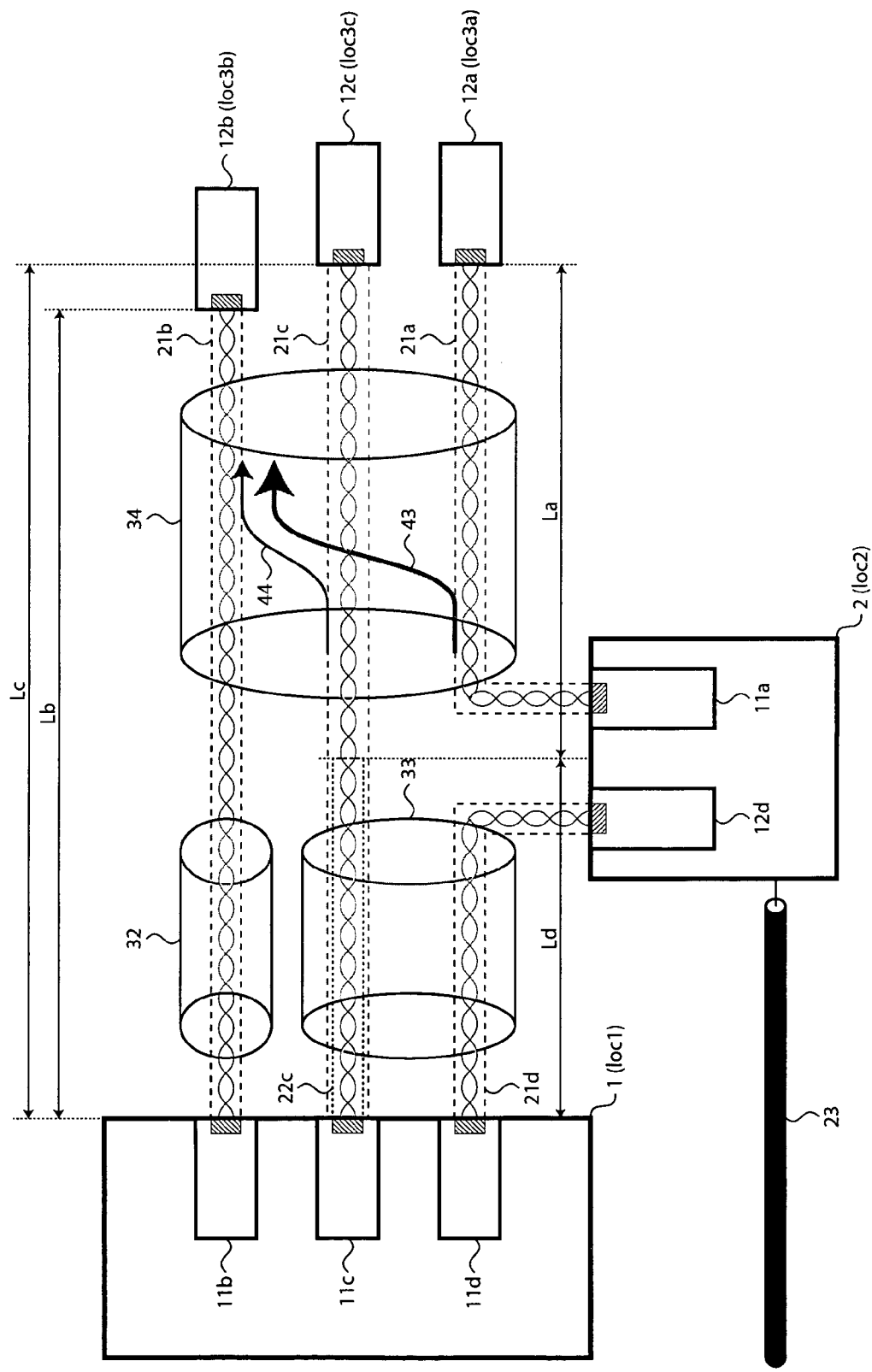
FIG. 2 represents the same data communication system with another loop plant topology.

There is seen in FIG. 2 an alternative loop plant topology. Between the central location loc1 and the remote location loc2, the lines 21c and 21d are enclosed within a binder 33, and the line 21b is enclosed together with further lines within another binder 32. Between the remote location and the customer locations, the lines 21a, 21b and 21c are enclosed within a same binder 34.

Denote the far-end crosstalk originating from the line 21a and coupling into the line 21b as 43, and the far-end crosstalk originating from the line 21c and coupling into the line 21b as 44. They can be modeled as:

$$43_m = k n_r^{0.6} (L_b - L_d) f^2 |H(L_b - L_d, f)|^2 S_a(f) \tag{13}$$

$$44_m = k n_c^{0.6} (L_b - L_d) f^2 |H(L_b, f)|^2 S_c(f) \tag{14}$$

The transmit PSD Sa is then given by (assuming the far-end crosstalks 43 and 44 have to match each other):

$$S_a(f) = g(L_d, |H(L_d, f)|) = \left(\frac{n_c}{n_r}\right)^{0.6} |H(L_d, f)|^2 S_c(f) \tag{15}$$

In this embodiment, only the loop insertion gain magnitude $|H(Ld,f)|$ needs to be estimated.

In an alternative embodiment of the present invention, the measurement unit Measd and the estimating unit Est form part of the transceiver unit 11d. The measurement unit Measd is for instance a time-domain reflectometry unit performing channel measurements of the line 21d. The transceiver unit 11d further accommodates a communication means for sending the so-estimated parameters to the computing unit Cpt, which determines therefrom the transmit PSD Sa. The parameters are sent for instance via the optical fiber 23.

In still an alternative embodiment of the present invention, the measurement unit Measd forms part of the transceiver unit 11d, and the estimating unit Est and the computing unit Cpt form part of a central server coupled via a communication network to the central unit 1 and to the remote unit 2. The central server gathers channel measurement chd_meas from the central unit 1, processes the measurements and computes therefrom the transmit PSD Sa as it was set forth in the description. The so-computed transmit PSD Sa is then sent to the remote unit 2 for operation.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for determining a transmit power spectral density to be applied at a remote location over at least one line connecting said remote location to at least a first customer location, by using a power control unit including a computing portion, a measurement portion, and an estimating portion, said method comprising:

modeling, by the computing portion, a first far-end crosstalk originating from said at least one line and coupling into a victim neighboring line as a first modeled far-end crosstalk, said victim neighboring line connecting a central location through said remote location to a second neighboring customer location, modeling, by the computing portion, a second far-end crosstalk originating from at least one additional neighboring line and coupling into said victim neighboring line as a second modeled far-end crosstalk, said additional neighboring line connecting said central location through said remote location to at least a third neighboring customer location, determining, by the computing portion, by using a mathematical derivation, said transmit power spectral density from said first modeled far-end crosstalk and said second modeled far-end crosstalk, expressing, by the computing portion, as part of said mathematical derivation, said transmit power spectral density as a function of a line parameter said line parameter characterizing a line segment of said additional neighboring line spanning from said central location to said remote location;

carrying out, by the measurement portion, channel measurements of a spare line that connects said central location to said remote location, said spare line and said line segment share common transmission characteristics, estimating, by the estimation portion, from said channel measurements a value of said line parameter, and determining, by the computing portion, said transmit power spectral density from said value of said line parameter.

2. A method according to claim 1, wherein said channel measurements are obtained by using time-domain reflectometry.

3. A method according to claim 1, wherein said channel measurements are obtained by initializing a communication path over said spare line between a first transceiver unit and a second transceiver unit.

4. A method according to claim 1, wherein said channel measurements comprise measurements of a response signal, and said response signal Is a response to a preliminary-known excitation signal that propagates through said spare line.

5. A method according to claim 1, wherein said line parameter is a length.

6. A method according to claim 1, wherein said line parameter is a loop insertion gain magnitude.

7. A power control unit configured to determine a transmit power spectral density to be applied at a remote location over at least one line connecting said remote location to at least a first customer location, wherein the power control unit comprises:

a computing portion configured to determine, by a mathematical derivation, said transmit power spectral density from a first modeled far-end crosstalk and a second modeled far-end crosstalk, said first modeled far-end crosstalk representing a first far-end crosstalk originating from said at least a first line and coupling into a victim neighboring line, said victim neighboring line connecting a central location through said remote location to a second neighboring customer location, said second modeled far-end crosstalk representing a second far-end crosstalk originating from at least a second neighboring line and coupling into said victim neighboring line, said second neighboring line connecting said central location through said remote location to at least a third neighboring customer location, said computing portion being further configured to express, as part of said mathematical derivation, said transmit power spectral density as a function of a line parameter, said line parameter characterizing a line segment of the second neighboring line spanning from said central location to said remote location, a measurement portion configured to carry out channel measurements of a spare line than connects said central location to said remote location, said spare line and said line segment sharing common transmission characteristics, and an estimation portion coupled to said measurement portion, and configured to estimate a value of said line parameter from said channel measurements.

* * * * *